(12) United States Patent
DeWaard

(10) Patent No.: US 8,728,801 B2
(45) Date of Patent: May 20, 2014

(54) COMPOSTER MECHANISM

(75) Inventor: Dave DeWaard, Lynden, WA (US)

(73) Assignee: Daritech, Inc., Lynden, WA (US)

( * ) Notice: Subject to any disclaimer, the term of this patent is extended or adjusted under 35 U.S.C. 154(b) by 982 days.

(21) Appl. No.: 12/357,232

(22) Filed: Jan. 21, 2009

(65) Prior Publication Data

US 2010/0112632 A1    May 6, 2010

(51) Int. Cl.
*C12M 1/00* (2006.01)
*B28C 5/18* (2006.01)

(52) U.S. Cl.
USPC .................. 435/290.1; 435/290.3; 366/53

(58) Field of Classification Search
USPC .................. 435/41, 262, 289.1, 290.1, 290.2, 435/290.3; 366/53–62.63, 184–187, 366/219–236

See application file for complete search history.

(56) References Cited

U.S. PATENT DOCUMENTS

| | | | |
|---|---|---|---|
| 2,041,318 A * | 5/1936 | Berger | 34/108 |
| 2,722,357 A * | 11/1955 | Whitecar | 141/133 |
| 2,948,593 A | 8/1960 | Larson | |
| 3,041,148 A * | 6/1962 | Ballantyne et al. | 422/209 |
| 3,178,267 A | 4/1965 | Larson | |
| 3,676,074 A | 7/1972 | Shibayna et al. | |
| 3,922,514 A * | 11/1975 | Greenhut | 200/246 |
| 3,952,421 A * | 4/1976 | Wilson et al. | 34/256 |
| 4,342,383 A * | 8/1982 | Burnett | 193/32 |
| 4,419,550 A * | 12/1983 | Monette | 200/80 R |
| 4,633,535 A * | 1/1987 | Louvo | 4/449 |
| 4,836,918 A | 6/1989 | Szikriszt | |
| 5,033,863 A * | 7/1991 | Linkletter | 366/228 |
| 5,292,637 A * | 3/1994 | Bohnensieker | 435/3 |
| 5,300,438 A | 4/1994 | Augspurger et al. | |
| 5,407,809 A * | 4/1995 | Finn | 435/41 |
| 5,534,437 A * | 7/1996 | Arrau | 435/290.3 |
| 5,586,731 A * | 12/1996 | Glaze et al. | 241/56 |
| 5,589,391 A * | 12/1996 | Fink | 435/290.3 |
| 5,593,888 A * | 1/1997 | Glaze et al. | 435/262.5 |
| 5,618,424 A | 4/1997 | Nagaoka | |
| 5,661,031 A | 8/1997 | Murphy et al. | |
| 5,716,013 A * | 2/1998 | Benson et al. | 241/33 |
| 5,759,850 A * | 6/1998 | Seymour | 435/290.3 |
| 5,776,768 A | 7/1998 | Seymour et al. | |
| 5,925,561 A | 7/1999 | Posselius, Jr. et al. | |
| 6,056,800 A * | 5/2000 | Carter, IV | 71/9 |
| 6,105,536 A | 8/2000 | DeWaard | |
| 6,281,001 B1 * | 8/2001 | McNelly | 435/262 |
| 6,397,492 B1 | 6/2002 | Malley | |
| 6,443,094 B1 | 9/2002 | DeWaard | |
| 6,783,975 B2 | 8/2004 | Windle | |
| 6,997,135 B1 | 2/2006 | DeWaard | |
| 7,056,441 B1 | 6/2006 | Menke et al. | |
| 7,138,271 B2 | 11/2006 | Pratte | |
| 7,270,754 B2 | 9/2007 | Menke et al. | |
| 7,306,731 B1 | 12/2007 | DeWaard | |
| 7,468,132 B2 | 12/2008 | Zotter et al. | |
| 7,631,595 B1 | 12/2009 | DeWaard | |
| 7,708,885 B2 | 5/2010 | Lanting et al. | |
| 7,987,778 B1 | 8/2011 | DeWaard | |
| 8,142,667 B2 | 3/2012 | DeWaard | |
| 8,201,495 B2 | 6/2012 | DeWaard | |
| 2001/0040131 A1 * | 11/2001 | Yamane | 210/601 |
| 2002/0006075 A1 * | 1/2002 | Ferris et al. | 366/25 |
| 2006/0154362 A1 * | 7/2006 | Sundberg | 435/290.3 |
| 2008/0093292 A1 | 4/2008 | Zotter et al. | |
| 2009/0065448 A1 | 3/2009 | Schedler | |
| 2009/0200231 A1 | 8/2009 | Walton et al. | |
| 2009/0249685 A1 | 10/2009 | Flowers et al. | |
| 2010/0112632 A1 | 5/2010 | DeWaard | |
| 2011/0100930 A1 | 5/2011 | DeWaard | |
| 2011/0198268 A1 | 8/2011 | DeWaard | |
| 2011/0253227 A1 | 10/2011 | DeWaard | |
| 2011/0309039 A1 | 12/2011 | DeWaard | |
| 2012/0000863 A9 | 1/2012 | DeWaard | |
| 2012/0138515 A1 | 6/2012 | DeWaard | |

FOREIGN PATENT DOCUMENTS

| | | |
|---|---|---|
| CA | 2336838 | 6/2001 |
| CA | 2690420 | 7/2010 |
| CA | 2719630 | 11/2010 |
| CA | 2732065 | 2/2011 |
| CA | 2737609 | 4/2011 |
| CA | 2764679 | 1/2012 |

* cited by examiner

*Primary Examiner* — Ethan C Whisenant
(74) *Attorney, Agent, or Firm* — Lowe Graham Jones PLLC

(57) ABSTRACT

A rotary composter having a fuselage member where a drive system is configured to rotate the fuselage member where the end caps are substantially stationary and do not rotate and the fuselage member has a plurality of longitudinally extending slats contained therein.

35 Claims, 16 Drawing Sheets

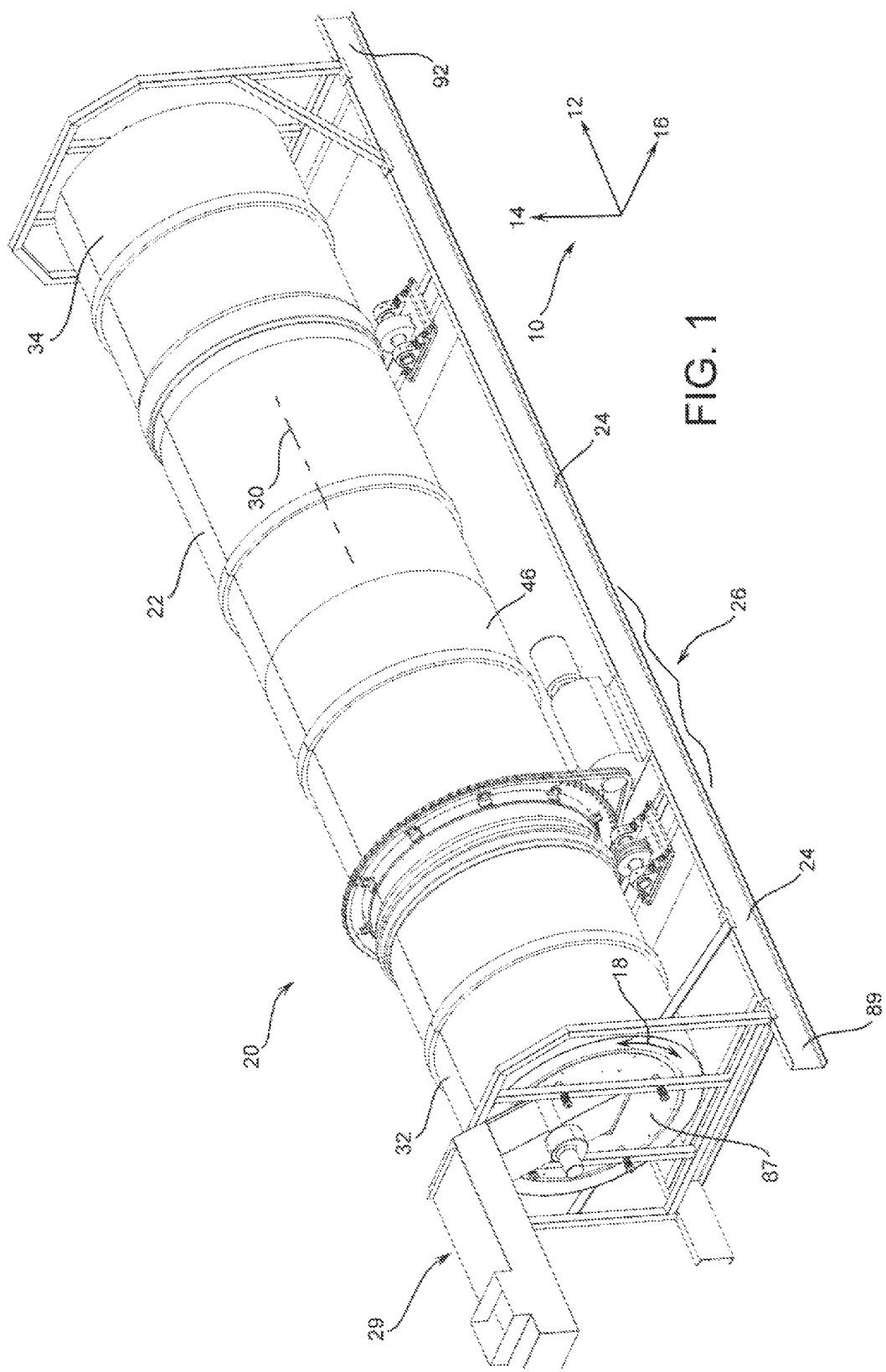

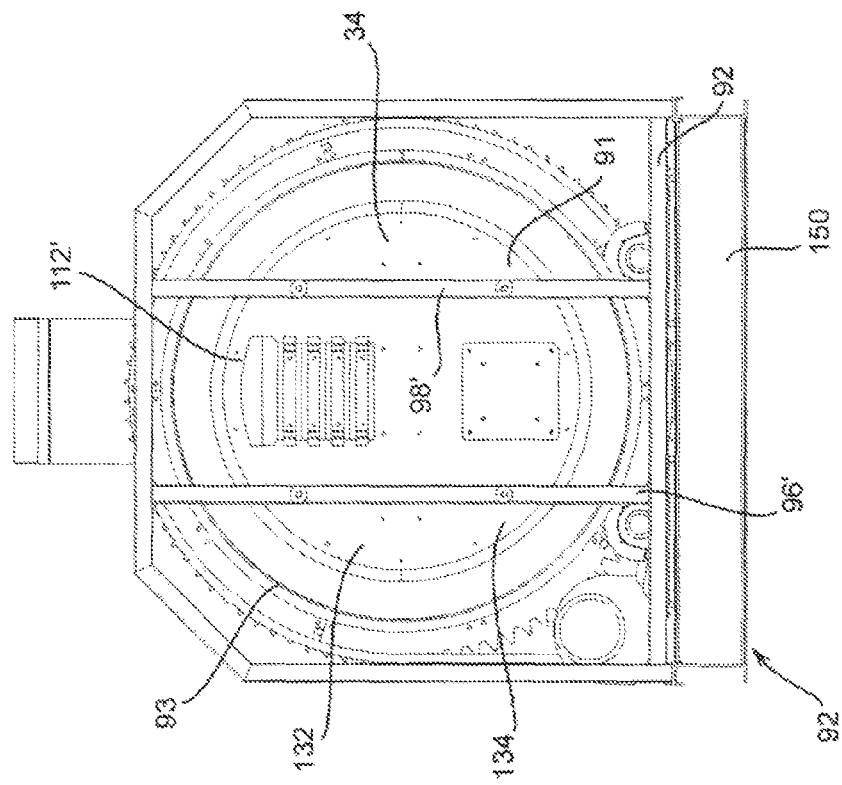
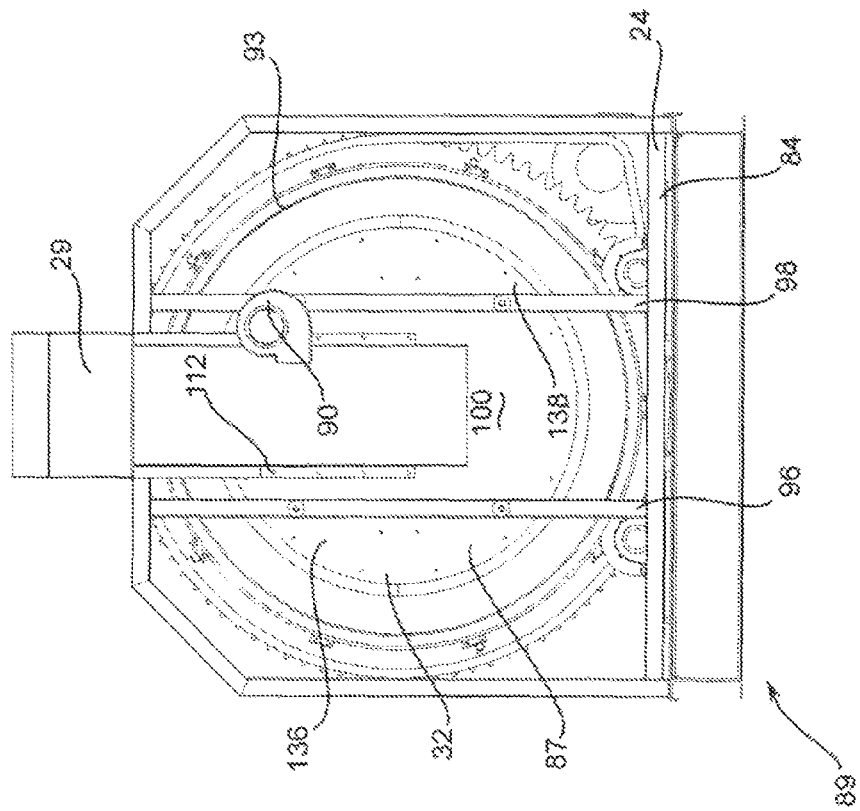
FIG. 3
FIG. 2

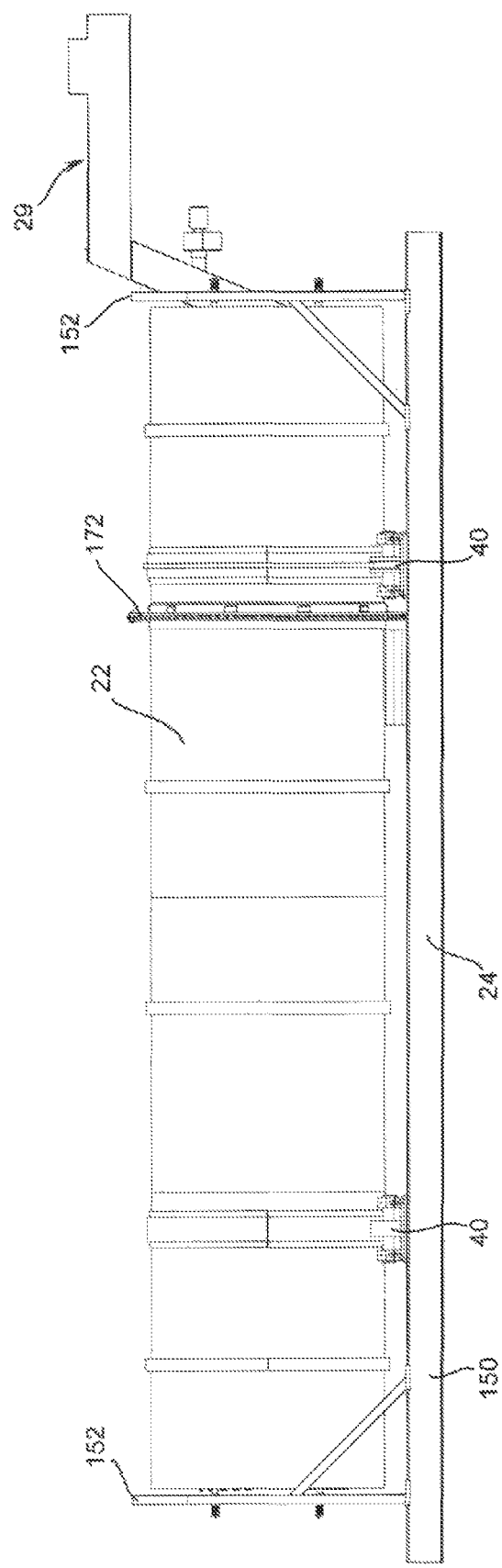

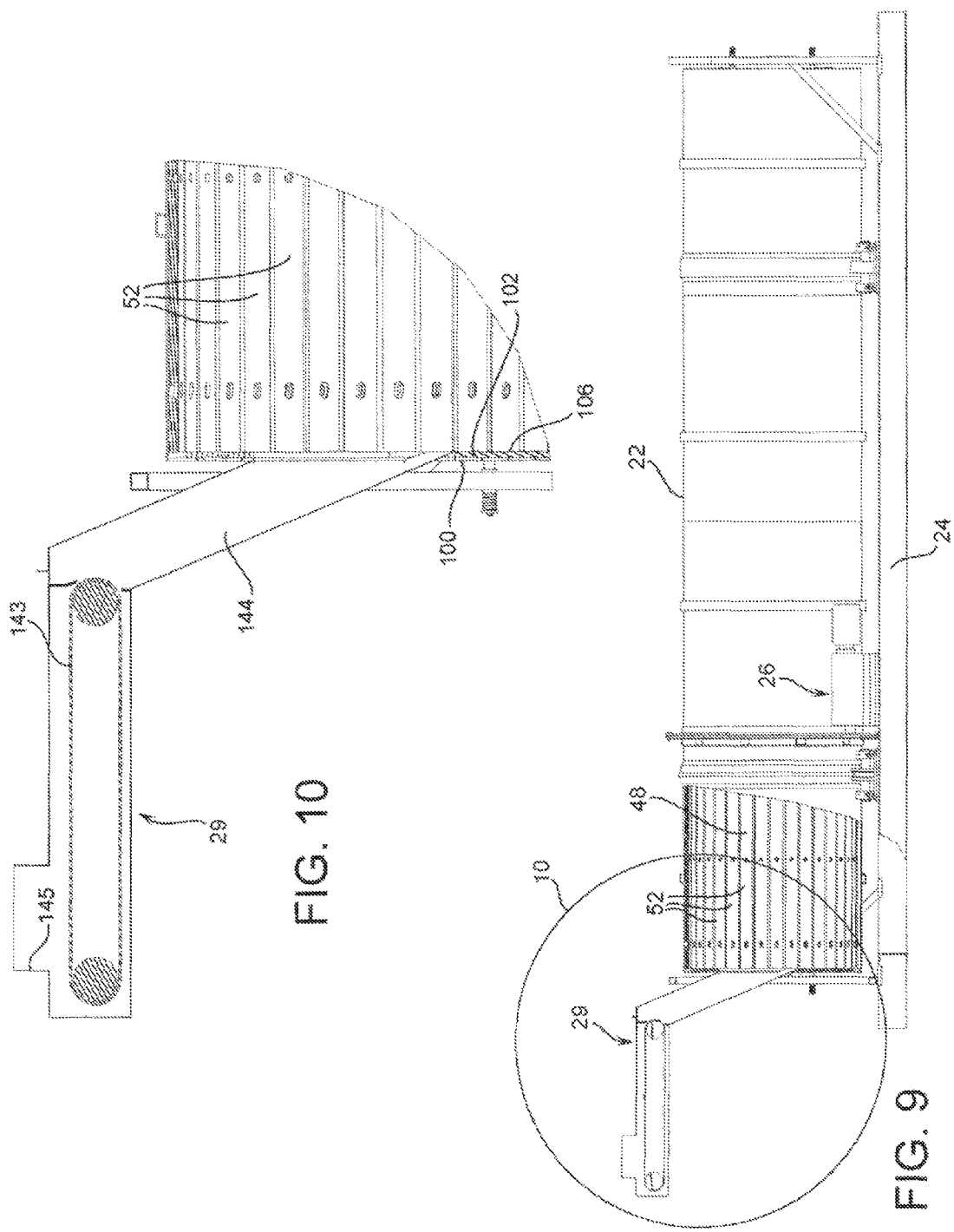

US 8,728,801 B2

COMPOSTER MECHANISM

RELATED APPLICATIONS

This application claims priority of U.S. Provisional Ser. No. 61/021,710, filed Jan. 17, 2008.

BACKGROUND OF THE DISCLOSURE

Composters have been utilized in many forms to alter the characteristics of raw composter material. In one form, microbes are utilized as composting mechanisms to alter the characteristics of raw material for more desirable purposes, such as potting soil.

Composters are arranged in a variety of manners in the prior art whereby in general, there is some sort of containment system to contain the pre-compost material therein and microbials are utilized for breaking down material into a more desirable chemical makeup which is more conducive for various agricultural purposes, such as potting soil, a supplement added to soil and with a variety of other uses well-known in the art. However, trying to conduct a large-scale composting system has traditionally been expensive and required the continuing refill of microbials therein with the raw composted material. Further, in prior art models that require rotation of the material for some form of agitation required awkward systems for rotating the composting container, and further, in time the rotation caused internal abrasive type-wear between the interior surface of the containment structure and the rotating material contained therein. Further, there have been issues of heat transfer loss and inadequately controlled temperature within the composting structure.

Therefore, the applicant has arrived at a novel solution for providing an economical large-scale composting mechanism. In general, longitudinal extending members are used in one form to provide a gapped space therebetween so as to allow a certain amount of the composting material to be positioned therein. This composting material provides the microbials to be multiplied with fresh material as the central main mass of the compost material advances forward. Further, the longitudinally extending slats, which in one form are made of a resilient material such as plastic, increase the insulation factor of the fuselage. Finally, the resilient members can take the extensive wear placed on the large mass of compost material which is rotating there within the chamber. Further, the long-term extending members in one form can be replaced, whereby in the alternative, replacing an entire expensive metallic fuselage is extremely cost-prohibitive. Other efforts and design elements are disclosed herein, and of course examples are shown to express the broad teachings of the applicant's concept.

BRIEF DESCRIPTION OF THE DRAWINGS

FIG. 1 shows an isometric view of one embodiment of the rotary composter;

FIG. 2 shows an end view along the longitudinal axis of one embodiment of the composter looking at the entrance portion of the composter;

FIG. 3 shows a view along the longitudinal axis showing one embodiment of the exit portion of the rotary composter;

FIG. 7 shows another opposing side view to that in FIG. 4 of the composter;

FIG. 9 shows a partial sectional view of the entrance portion of the composter;

FIG. 10 shows a detailed view of circle 10 of FIG. 9 showing one form of the entrance portion of the composter;

DESCRIPTION OF THE PREFERRED EMBODIMENTS

Figure 4:
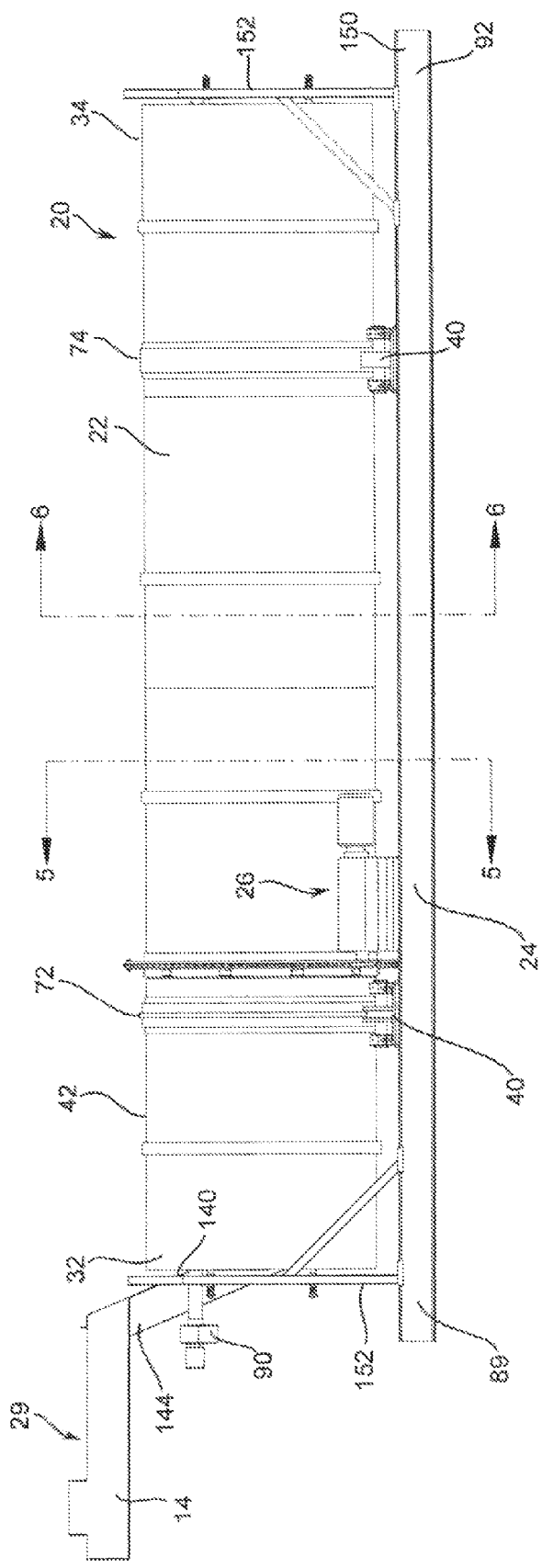
FIG. 4 shows a side view along the lateral axis of one embodiment of the rotary composter.
Figure 6:
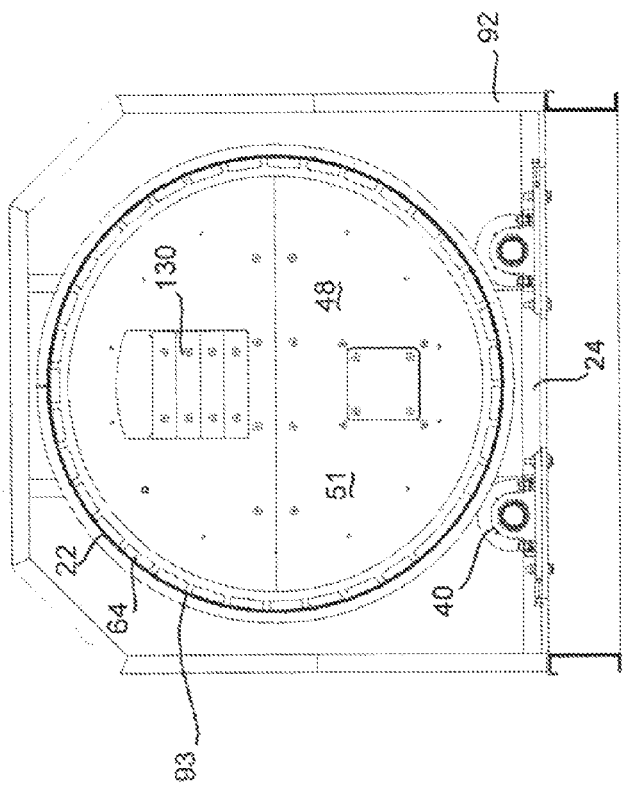
FIG. 6 shows a cross-sectional view taken that line 6-6 showing the interior portion of the exit region of the composter.

As shown in FIG. 1, there is a rotary composter 20. Before further description of the rotary composter 20 there is first defined an axes system 10 which comprises a longitudinal axis 12, a vertical axis 14, and a lateral axis 16. A circumferential direction is shown at 18 and generally centers upon the horizontal axis 30.

Still referring to FIG. 1, there can be seen the rotary composter 20 which in one form comprises a fuselage member 22, a base frame 24 and a drive system 26. Further, there is a feed mechanism 29 shown in FIG. 8 and a second embodiment of an example of a feed mechanism 29' shown in FIGS. 18-20. There will first be a detailed discussion of the fuselage member 22 followed by a description of the other components and assemblies.

Figure 14:
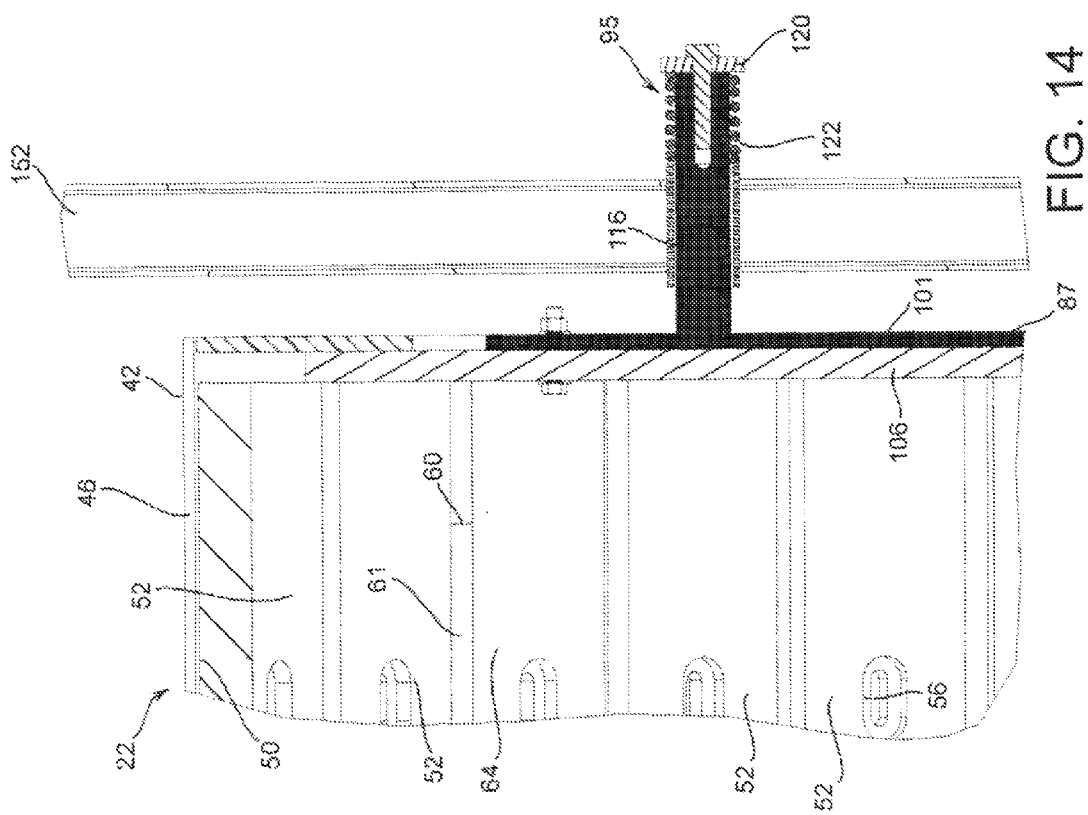
FIG. 14 shows a partial cross-sectional view taken at line 14-14 of FIG. 13 showing one embodiment of the expanding attachment system.

As shown in FIG. 1, the fuselage member generally comprises a center longitudinal axis 30 that extends in the longitudinal direction 12. As shown in FIGS. 2 and 3, there are longitudinal end views that generally show an entrance portion 32 and an exit portion 34. In one form, the fuselage is further comprised of an input 33 and an output 35. As shown in FIG. 4, there is a side view of the fuselage member 22 where it can be appreciated that (in one form) the fuselage member rotates about the rotary supports 40, which are rotationally attached to the base frame 24. It one form, the fuselage member 22 is further attached to the base frame at first and second end portions 89 and 92 (see FIG. 1) by way of an expanding attachment system 95 as shown in FIG. 14, which is described in greater detail herein below.

In one form, the fuselage member 22 as shown in FIG. 4 has an outer surface 42 which in one form is a cylindrical member.

Figure 8:
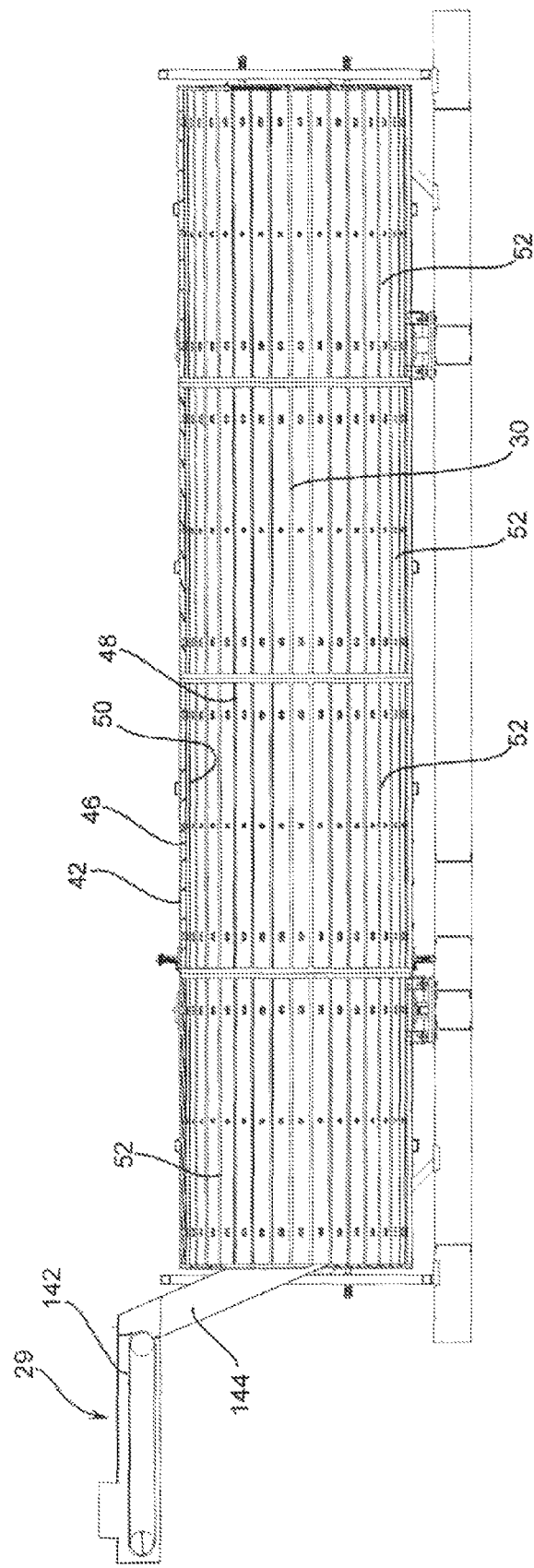
FIG. 8 shows a cross-sectional view of the composter in one form showing an interior chamber region and the plurality of longitudinal slats positioned therein.

As shown in FIG. 8, the outer surface can be a portion of a metallic cylinder 46. FIG. 8 shows a cross-sectional view taken along the lateral direction showing an interior chamber region 48. The metallic cylinder 46 further has an interior surface 50 which in one form is configured to receive and have fixedly attached thereto the plurality of longitudinally extending slats 52.

The longitudinal slats 52 in one form are made of an abrasive resistant material, such as plastic, and namely ABS where the temperature range and the wear factors is higher than high-density polyethylene which is another form of material. The thickness of the slats can be 1.5 inches in one form, and can vary by 50% or more (⅜"-2.5"). In another form, thinner slats can be used (½ inch thick in one form) as long as the insulating qualities are not hindered. Other prior art devices have used similar slats which extend inwardly to mix and move the material contained within, applicant's slats in one form are larger in their circumferential width than their radial thickness, although a plurality of this slats may be provided to accomplish the same desired outcome of retaining heat within the fuselage. To this end, in one form the circumferential gaps between slats account for substantially less than ½ the inner diameter of the fuselage.

In the broader scope, the longitudinal slats can be replaced with other types of similar structures, such as a flexible member that is rolled in either the radial direction or the longitudinal direction. This material would have various indentations or openings for allowing a certain amount of the compost material to be "nestled" therein for preserving the microbes. Longitudinally extending members are, of course, one way of conveniently and economically producing partial cavities for this purpose; however, this can be accomplished in a plurality of other implementations.

Figure 13:
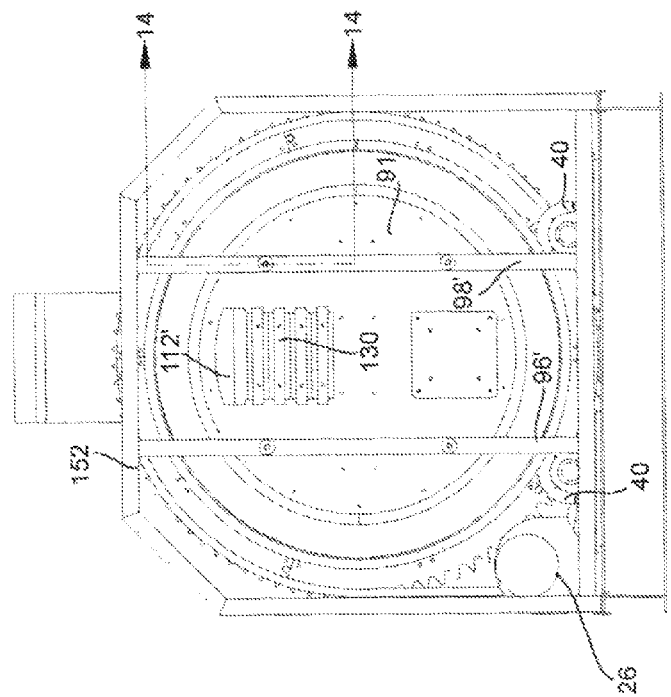
FIG. 13 shows an end view of the composter similar to that shown in FIG. 3 except with an illustration of one form of altering the cross-sectional opening of the exit passage.

Referring now to FIG. 14 there is shown a partial sectional view along line 14—14 as shown in FIG. 13. FIG. 14 shows a portion of the longitudinally extending slats 52, and it can be appreciated that these slat members can be attached by way of a fastener (not shown) extending through the surface defining the openings 56. In general, the longitudinal slats 52 are positioned in the fuselage member 22 and spaced apart in the circumferential direction 18 by a dimension indicated at 60 in FIG. 14. In general, the distance 60 can be between ⅛ of an inch to 2 inches or more in the broader scope. The thermal expansion coefficients of the slats 52 and the metallic cylinder 46 may be different whereas the plastic slats 52 may expand more or less than the metallic cylinder 46. One reason for having a spacing 61 between two adjacent longitudinal slat members is to provide an opportunity for the raw composting material and partially composted material, as well as the fully composted material, to be interposed therebetween. The material in one form includes composting microbials which facilitate the composting process. The spacing 61 provides an opportunity for forming a retention chamber for a portion of the composting material to remain within the composter to facilitate the composting action of newly added material from the entrance portion of the composter. It should be further noted that the slat members 52 further have an interior surface 64 which can be resistant to wear. In general, the metallic cylinder 46 can be subject to wear as the drive system 26 (see FIG. 1) rotates the fuselage member 22 repeatedly. If the outer metallic cylinder 46 were to erode, or otherwise decrease in thickness, the entire fuselage member may require major repair or replacement. However, by placing the longitudinal slats 52 as shown in FIG. 8, these members can be replaced if required. A bed-liner type material such as Rhino Lining™ may be placed between the interior surface 50 and the slats 52.

It should be further noted that the slats 52 increase the insulation factor for the fuselage member 22, thereby allowing a greater amount of heat to be retained in the interior chamber region 48. In one form, the longitudinal expansion members increase the r-value of the heat transfer from the interior chamber portion to an outer surface of the fuselage member by a value of R-4. Referring back to FIG. 14, it can be appreciated that the surface as defined by the openings 56 can extend in the longitudinal direction so as to allow thermal expansion of the outer metallic cylinder 46. In general, the operating temperature of the unit can be between, for example, 100° F.-160° F. One preferred temperature range is approximately around 140° F. plus or minus 10%. The temperature can be in part controlled by an air convection unit 90 as shown in FIG. 2 and described further herein.

Referring back to FIG. 4, it can be appreciated that the outer surface 42 in one form comprises guide track regions 72 and 74. The guide track region cooperates with the rotary supports 40 of the base frame 24 to provide a track rotational region for controlled rotation of the fuselage member 22.

Figure 11:
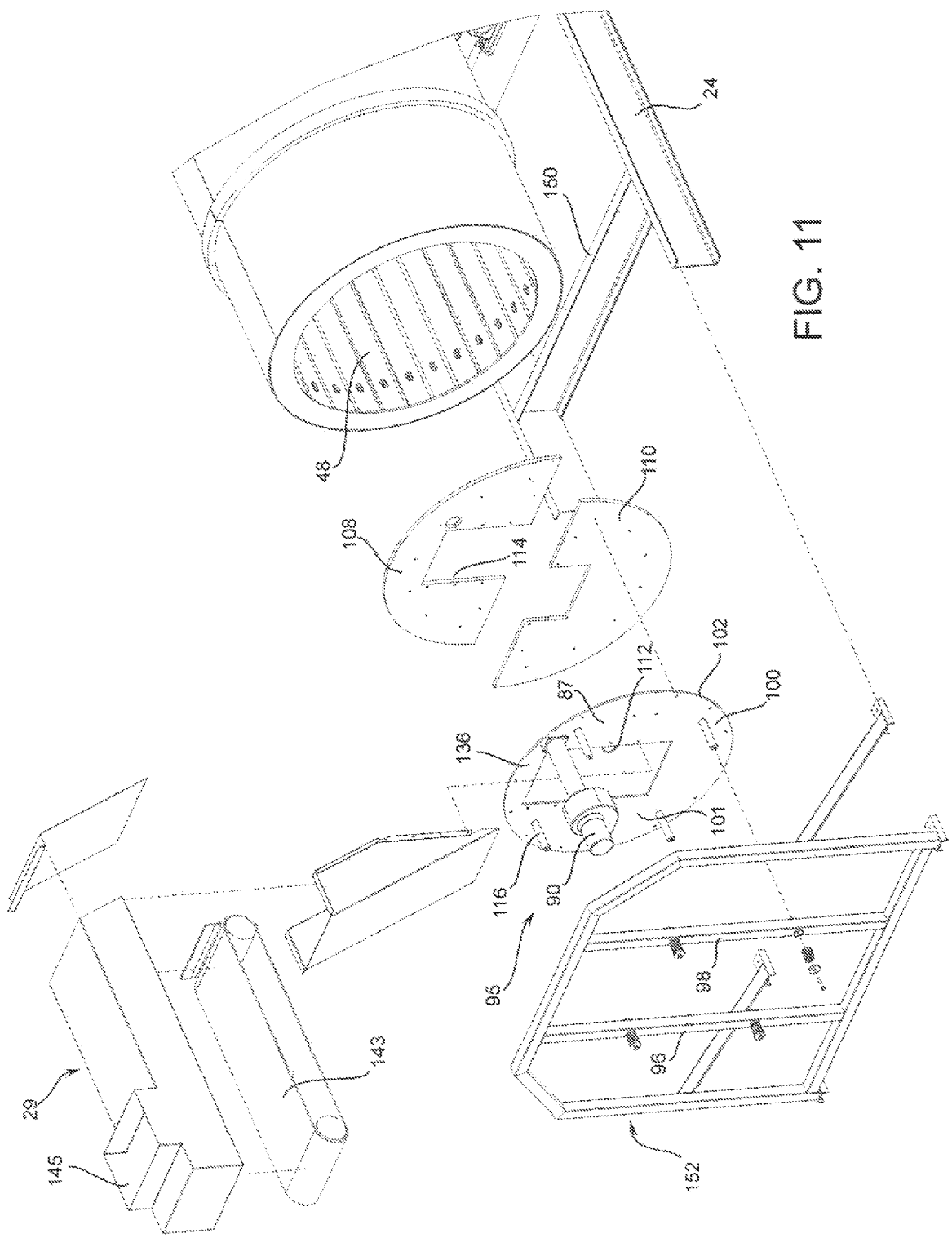
FIG. 11 shows a partially exploded view of one form of the entrance and the feed mechanism.

There will now be a detailed description of the entrance and exit portions 32 and 34 of the fuselage member 22 (see FIG. 1). There will first be a description of the entrance cap 87 with initial reference to FIG. 2. The entrance cap member 87 in a preferred form is substantially fixedly attached to a first end 89 of the base frame 24. The first end 89 of the base frame 24 in one form comprises support members 96 and 98. The entrance cap 87 in one form is comprised of an outer surface 100 and an inner surface 102 as shown in FIG. 10. As further shown in FIG. 10, an insulated panel 106 is provided, and as best shown in FIG. 11, the insulated panel 106 in one form is comprised of first and second components 108 and 110. The insulated panel 106 may in one form be formed of the same or similar material to the slats 52. An entrance passage 112 is defined by a surface defining such an opening where the first component 108 has a surface defining an opening 114 which corresponds in location to a portion of the passage 112 when assembled. In one form, the first and second components 108 and 110 are positioned within the interior chamber 48 and reassembled therein and attached to an outer plate 101.

In one form, the insulating panel 106 is a wear-resistant material and provides a certain amount of thermal insulation. In one form, of course, first and second components 108 and 110 are utilized, but in the broader scope the panel 106 could be a unitary structure.

Figure 5:
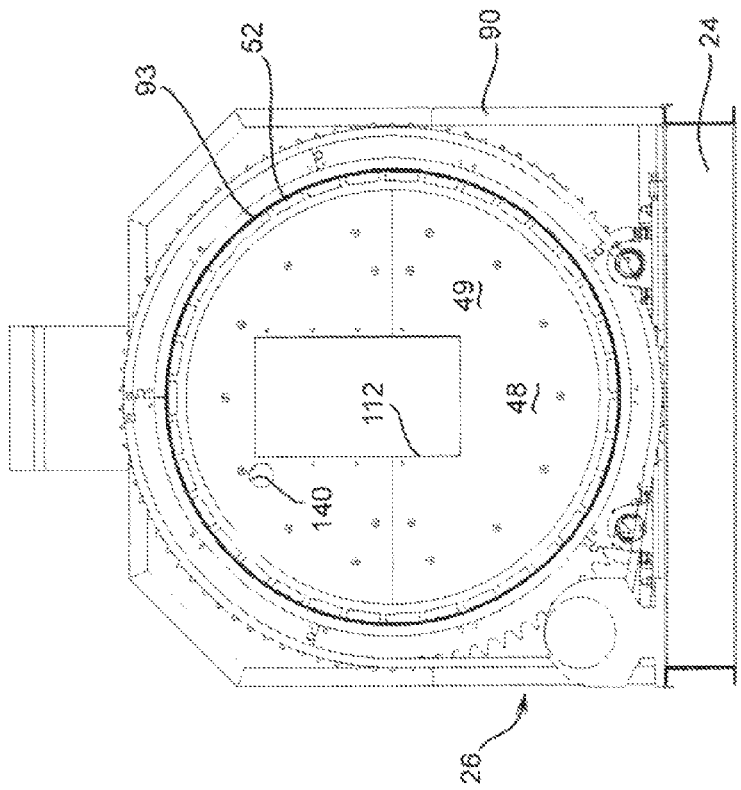
FIG. 5 shows a view taken along line 5-5 of FIG. 4 showing a cross-sectional view of the composter toward the entrance region.

Still referring to FIG. 11, it can be appreciated that the outer plate 101 is provided in one form with longitudinal attachment members 116. In one form, the longitudinal attachment members comprise an expansion attachment system 95. In one form, the expansion attachment system 95 is utilized to attach both the entrance cap 87 and the exit cap 91. In other forms, this expansion system could be used to attach to either end of the rotary composter 20. Of course, this system is shown by way of example, and other attachment mechanisms could be utilized. The interface bearing region 93 shown in FIGS. 2 and 3 around the end caps 87 and 91 in one form is a plastic material that provides a seal and a point (bearing) for rotation of the fuselage member 22. In the end portion 89 in one form, there is a passageway 140 (see FIG. 5) operatively configured to draw air from the interior chamber region 48. This passageway 140 in one form is on the opposing side of the rotation so as to not interfere with the angle of repose of the manure contained therein. FIG. 5 further shows an interior where pad 49 where similar type of pad 51 can be located on the opposing and region of the device. In general wear pads can be comprised of a similar material of the slat members 52 which in one form is a plastic material are recycled plastic type material.

Figure 15:
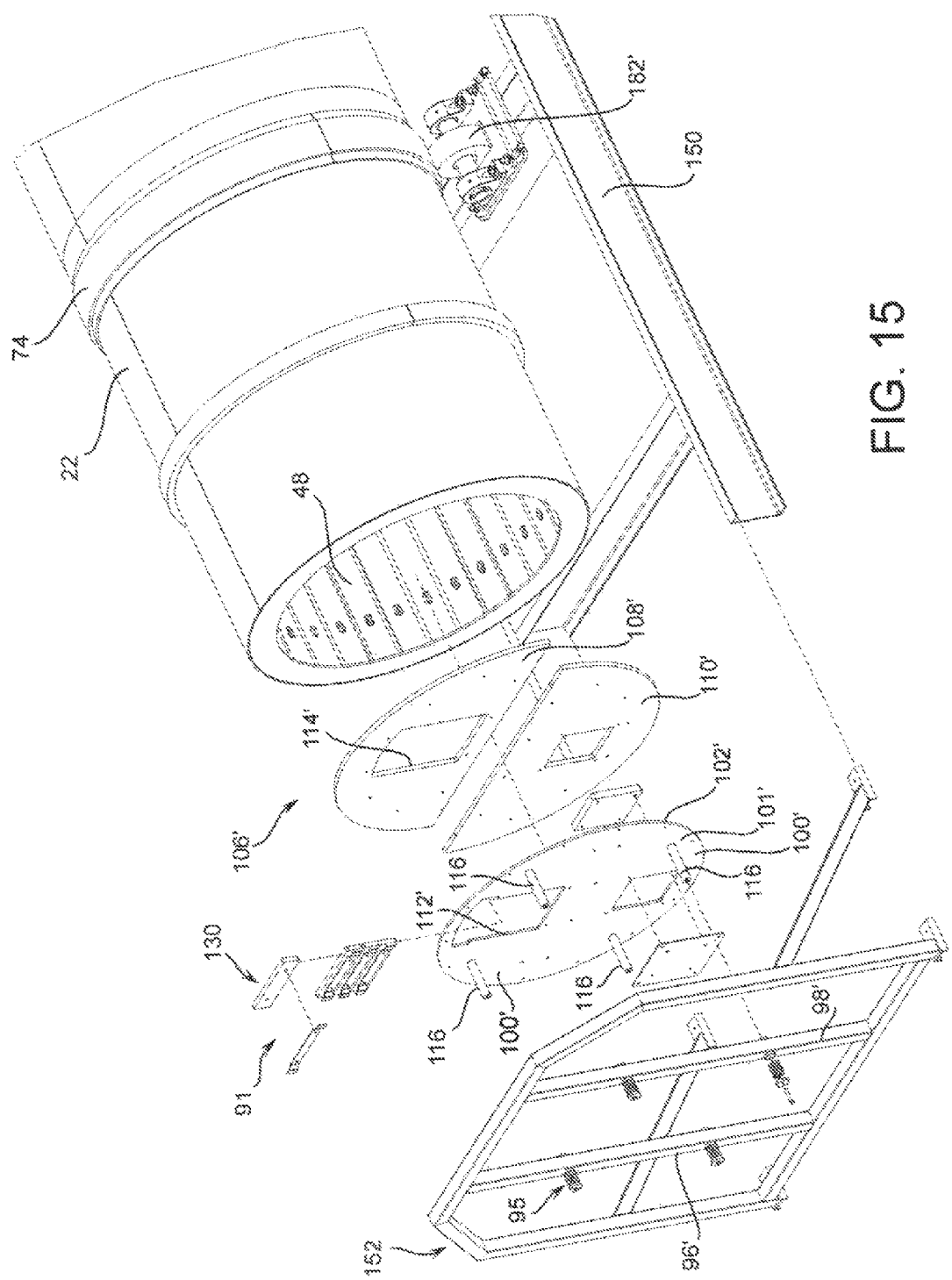
FIG. 15 shows a partially exploded view of one embodiment of the exit.

Referring now to FIG. 15, it can be seen that the exit cap 91 comprises a plurality of similar exit slot members 130, and the outer plate 101' has the exterior surface 100' and the interior surface 102'. The insulating panel 106' can be comprised of first and second components 108' and 110'. The exit passage 112' can correlate in location with the opening 114'. In one form, the longitudinal attachment members 116 are similar in nature as the members described above with reference to FIG. 11. The base member can further have the support members 96' and 98'. In one form, the exit passage 112' can be provided with an adjustable exit size by way of utilizing exit slot members 130 as shown in the upper part of FIG. 15. Of course, a plurality of different methods can be utilized to adjust the height of the exit passage 112'. As shown in FIG. 3, it can be appreciated that the exit cap 91 has an upper region 132 and a lower region 134. As further shown in FIG. 2, the entrance cap 87 also has an upper region 136 and a lower region 138.

Referring to FIG. 14, there can be seen in cross-sectional form the expansion attachment system 95. As noted above, the longitudinal attachment members 116 can be welded or otherwise integral with the outer plate 101. In one form, the cap 120 is fixedly attached to the longitudinal attachment member 116, and a spring element 122 provides a force to press the entrance cap 87 longitudinally inwardly. Because the internal compost material provides a certain amount of weight and is agitated as the fuselage member rotates, it is desirable to have a longitudinally inward force to press against this material. Therefore, in one form the spring element 122 would be in tension, but in other orientations a compression spring element could be utilized. It should be further noted that if the outer metallic cylinder 46 expands by way of (for example) thermal expansion, the expansion attachment system 95 could accommodate this expansion. Referring back to the slat members 52, it is noted that the attachment openings 56 as shown in FIG. 14 in one form extends in the longitudinal direction; which can be advantageous because the thermal expansion coefficient of the longitudinal slat members is different than the thermal expansion coefficient for the outer metallic shell.

Referring now back to FIG. 11, it can be appreciated that in one form, an air convection member 90 is positioned in the upper region 136 of the end cap 87, whereby the air convection member in one form can be a rotary fan which would be configured to bias air within the interior chamber region 48. As shown in FIG. 5, the passageway 140 can be in communication with the air convection member 90 to bias air within the chamber region and adjust the temperature of the compost material.

As shown in FIGS. 4 and 8, a feed mechanism 29 is provided which in one form can have a feed member such as a belt feed member 142 which is provided to feed raw material to be composted through the chute 144. As shown in FIG. 5, there is shown one form of the entrance passage 112 where the material to be composted is deposited into the interior chamber region 48. As shown in FIG. 11, there is a partially exploded view of the feed mechanism 29. In one form, the belt 143 is driven by some mechanical means, such as an electric motor. The upper entrance 145 can be in communication with a source of the raw material.

Referring to the various previously noted figures, the base frame 24 in one form can comprise a base platform 150, as shown in FIG. 11, which can be comprised of C-channel, I-beam, L-bracket or other structural members. Fixedly and removable end assemblies 152 can be attached to the base platform 150. In one form, the end assemblies 152 at either end of the device as shown in FIG. 4 are similar in design and construction.

Figure 16:
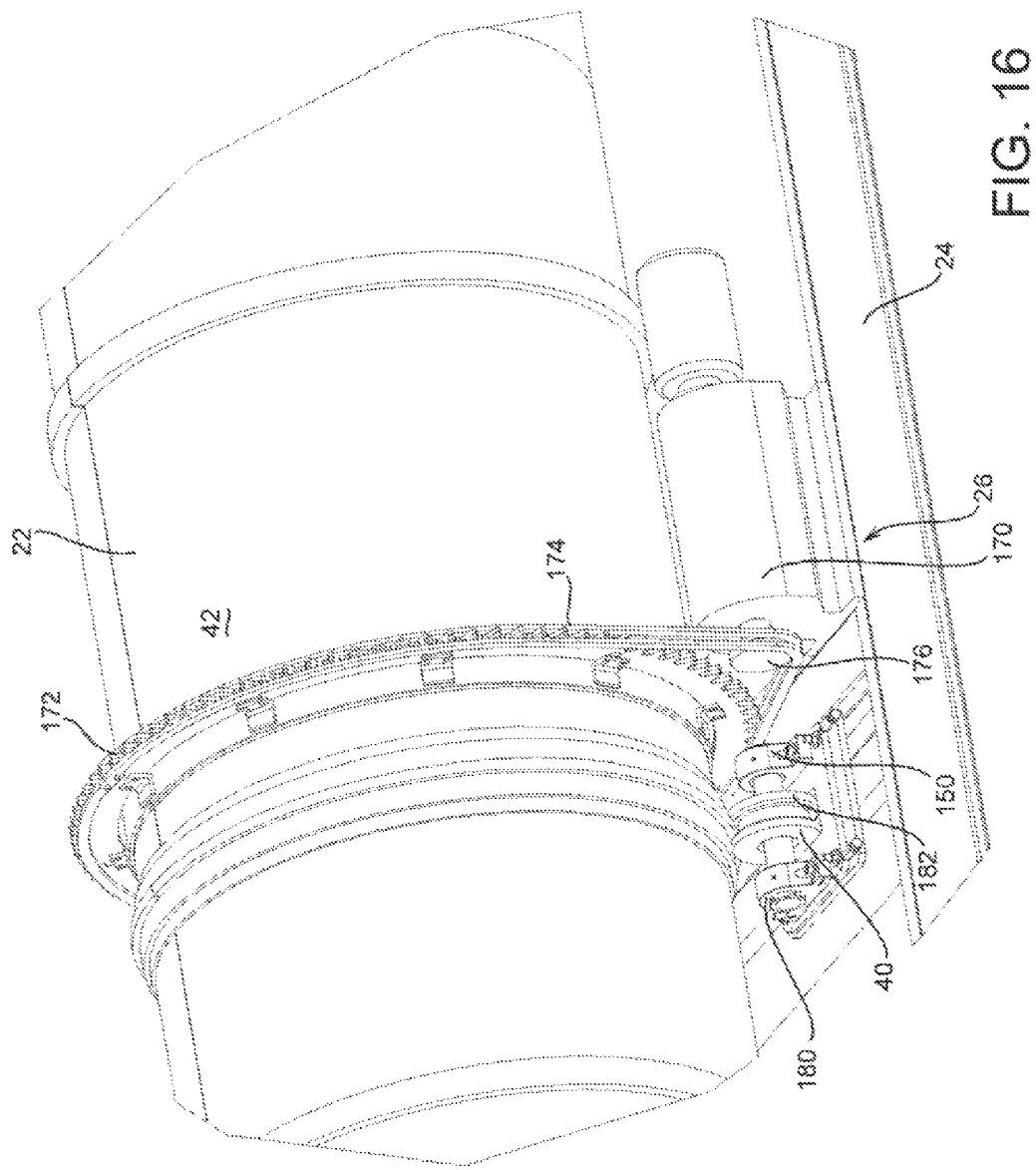
FIG. 16 shows a close-up view of one embodiment of the drive systems.
Figure 17:
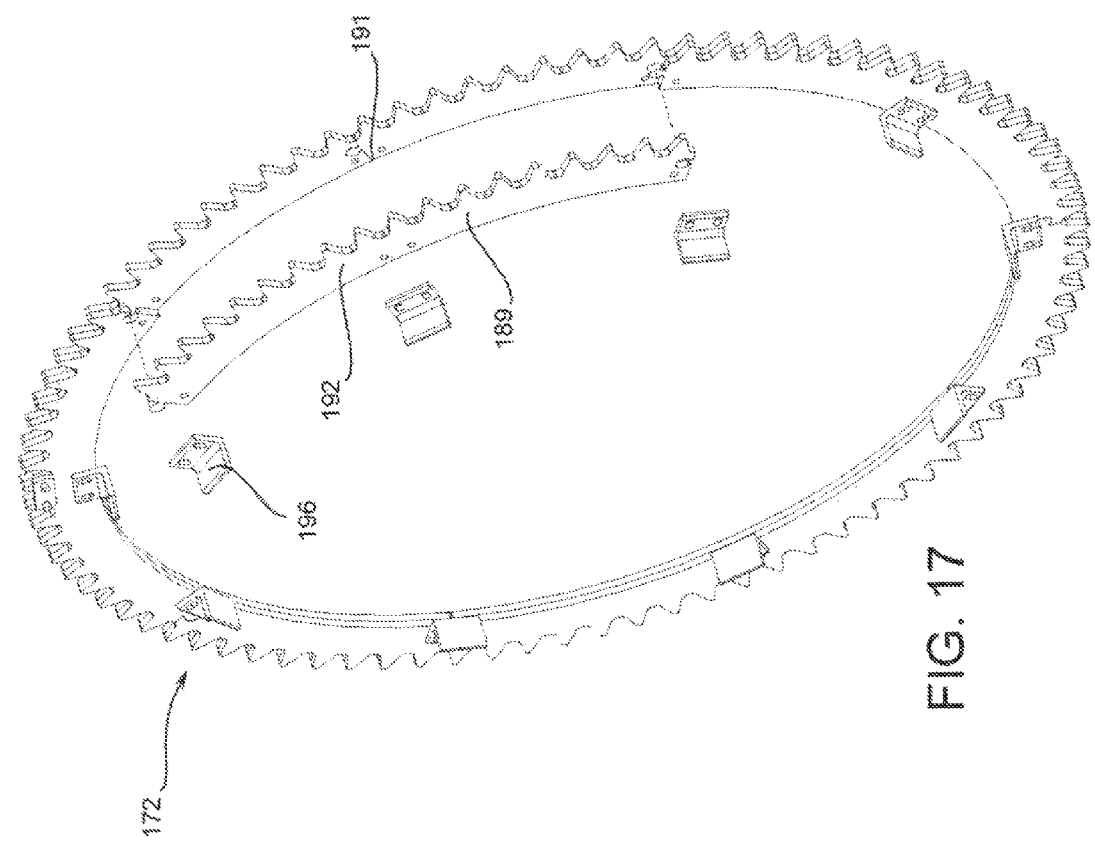
FIG. 17 shows one form of a fuselage gear.

With the foregoing description in place, there will now be a description of the drive system 26, as shown in the isometric view in FIG. 1. In general, the drive system 26 is configured to rotate the fuselage member 22. Referring ahead to FIG. 16, there is show a close-up view of the drive system 26, where in one form an actuator 170 is utilized which can be an electric motor, for example, in one form with a gearbox or gear reduction system in combination. The fuselage gear 172 can be fixedly attached to the fuselage member 22 and a drive chain 174 is in communication with a drive gear 176. As noted above, the rotary supports 40 can be of a variety of designs, but in general a preferred form is to provide journal bearings 180 to handle the weight of the fuselage member 22 as well as the contents contained therein. In one form, the wheel 182 is operatively configured to reposition in the longitudinal direction to account for the thermal expansion, or otherwise as shown in FIG. 15, the wheel 182' can accommodate such thermal expansion in the longitudinal direction. Of course, a variety of drive systems can be utilized. In one form, the drive system will rotate at an angular rotation of 1-60 rotations per hour. FIG. 17 shows a view of one form of assembling a fuselage gear 172. In general, overlapping components 189 can be utilized whereby the intersect portion 191 is in a central region 192 of an adjacent component. A plurality of fuselage fasteners 196 can be employed, which can be fastened by welding, rivets, or bolted to the outer surface 42 of the fuselage member 22 (see FIG. 16).

Figure 18:
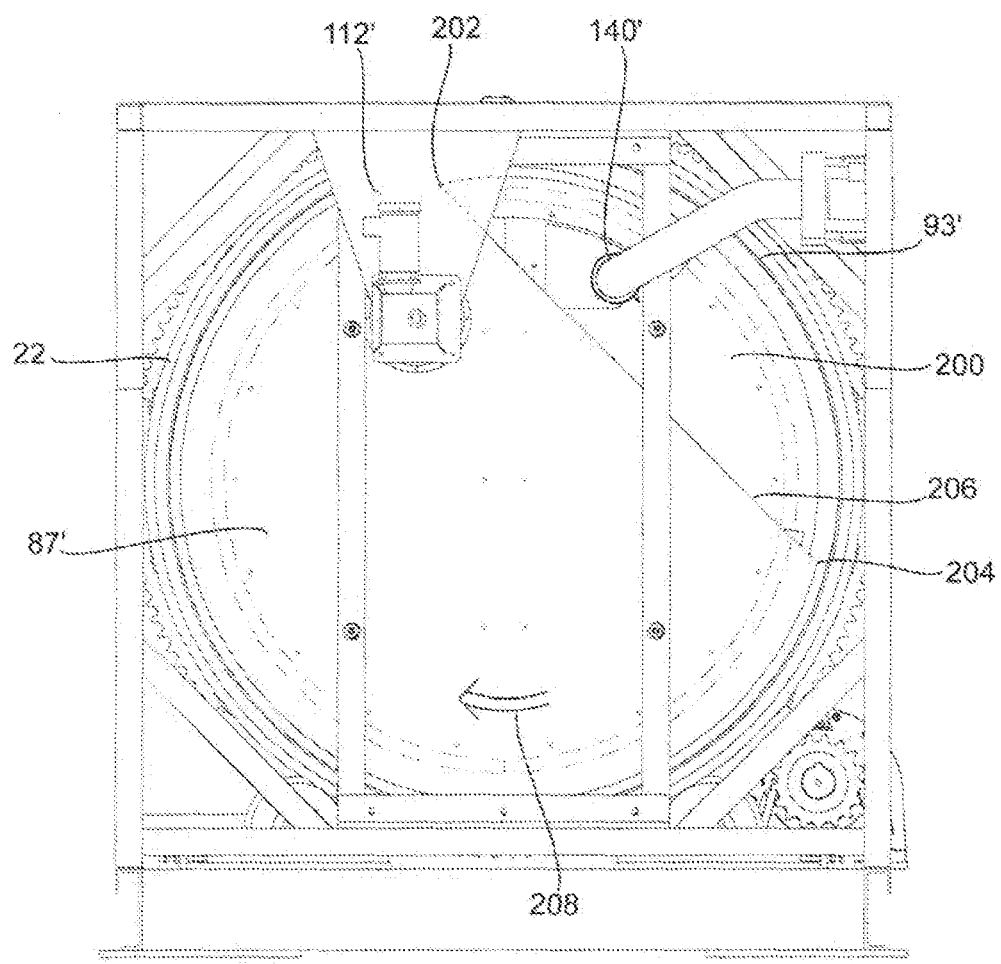
FIG. 18 shows one form of an entrance cap which substantially covers the entrance end of the fuselage.
Figure 19:
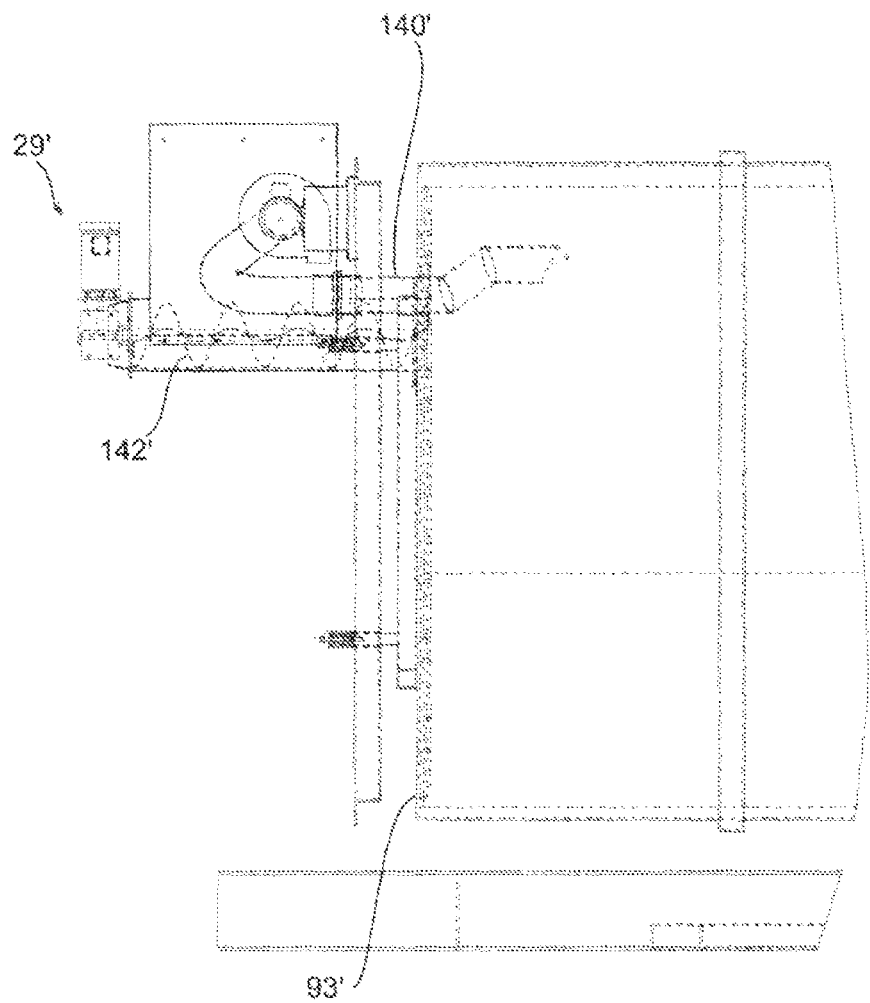
FIG. 19 shows a partial hidden line view of one embodiment of the entrance end of the fuselage.

As shown in FIGS. 18 and 19 the air space region 200 is provided in the interior chamber and is generally bounded by an edge 206 having end regions generally indicated at 202 and 204. In one form, this air space region 200 allows for air to pass there through and provides an opening for the passageway 140'. In this embodiment, the fuselage is arranged to rotate in a clockwise direction as indicated by the arrow at 208.

Figure 20:
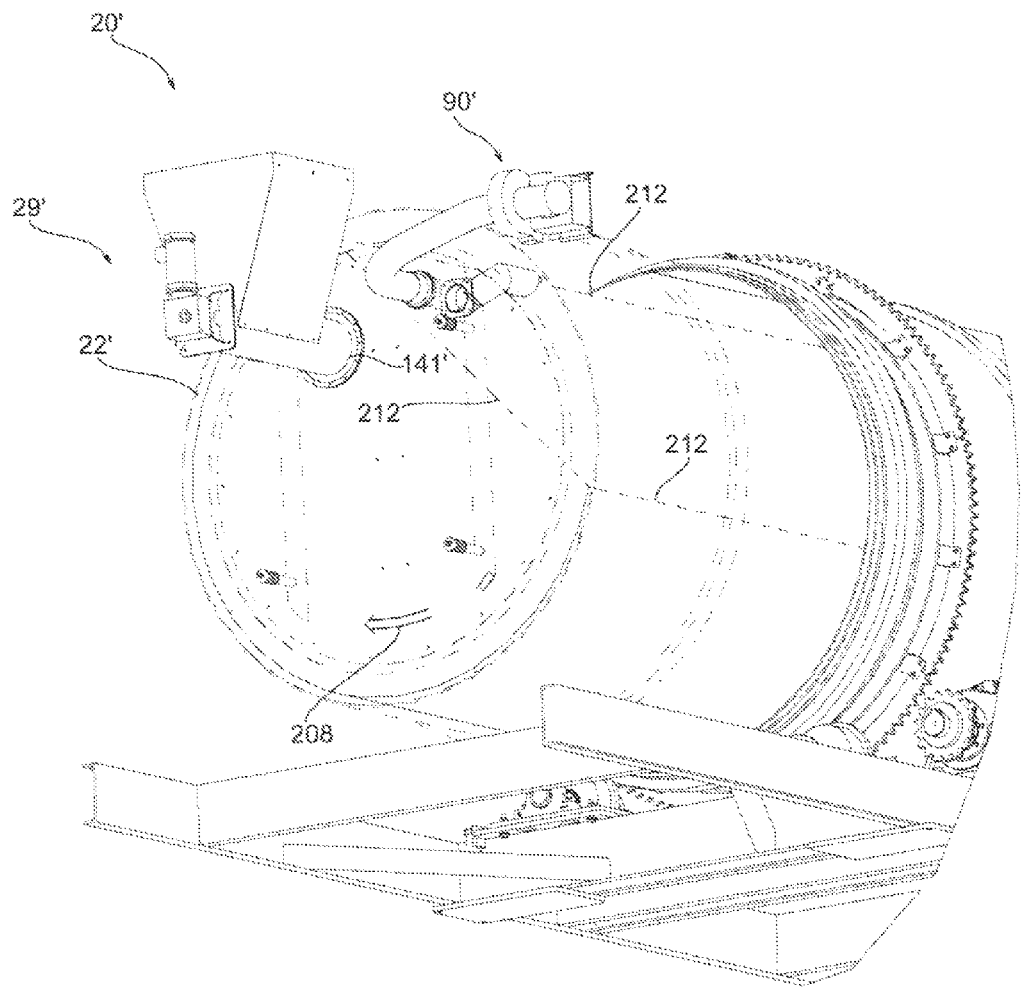
FIG. 20 shows a partial hidden line/cutaway view of one embodiment of the entrance end of the fuselage.

As the material contained within the fuselage rotates in the clockwise direction 208, friction will tend to rotate the material such that the material level 212 as shown in FIG. 20 is substantially not horizontal, but rather is bounded by the edges 212 as an angular plane indicating an upper surface of the composting material. FIG. 19 further shows another type of feed mechanism 29' wherein a feed member 142' which in one form can be an augur-type feed member is utilized. In general, the augur-type feed member 142' can forcefully impart precomposted material into the central chamber of the composter. As generally shown in FIGS. 18 and 20, the lines 212 generally indicate a reference plane where compost material would be contained therein, and the angle at 212' roughly indicates an angle of repose of the material having a clockwise rotation to rotate the fuselage member 22'. It should be further noted in FIG. 20 that the exit 141' of the feed mechanism 29' is positioned in a manner to be beneath the material level 212. By positioning the exit location beneath the material and having the augur force newly added material to be composted thereunder, the air convection unit 90' is not "short-circuited." In other words, the air entering the rotary composter 20' must come from the opposing longitudinal end region.

Of course the above embodiment shows one way of carrying out the applicant's concept. Further disclosed above are various mechanisms shown in one form, such as a feed mechanism shown in two separate forms of a belt feed and feed auger. Of course, other types of feed systems can be employed in the broader scope. Further, although certain materials provide certain advantages, such as having a plastic material composing the longitudinal slats, other types of materials can be utilized throughout the apparatus.

Figure 12:
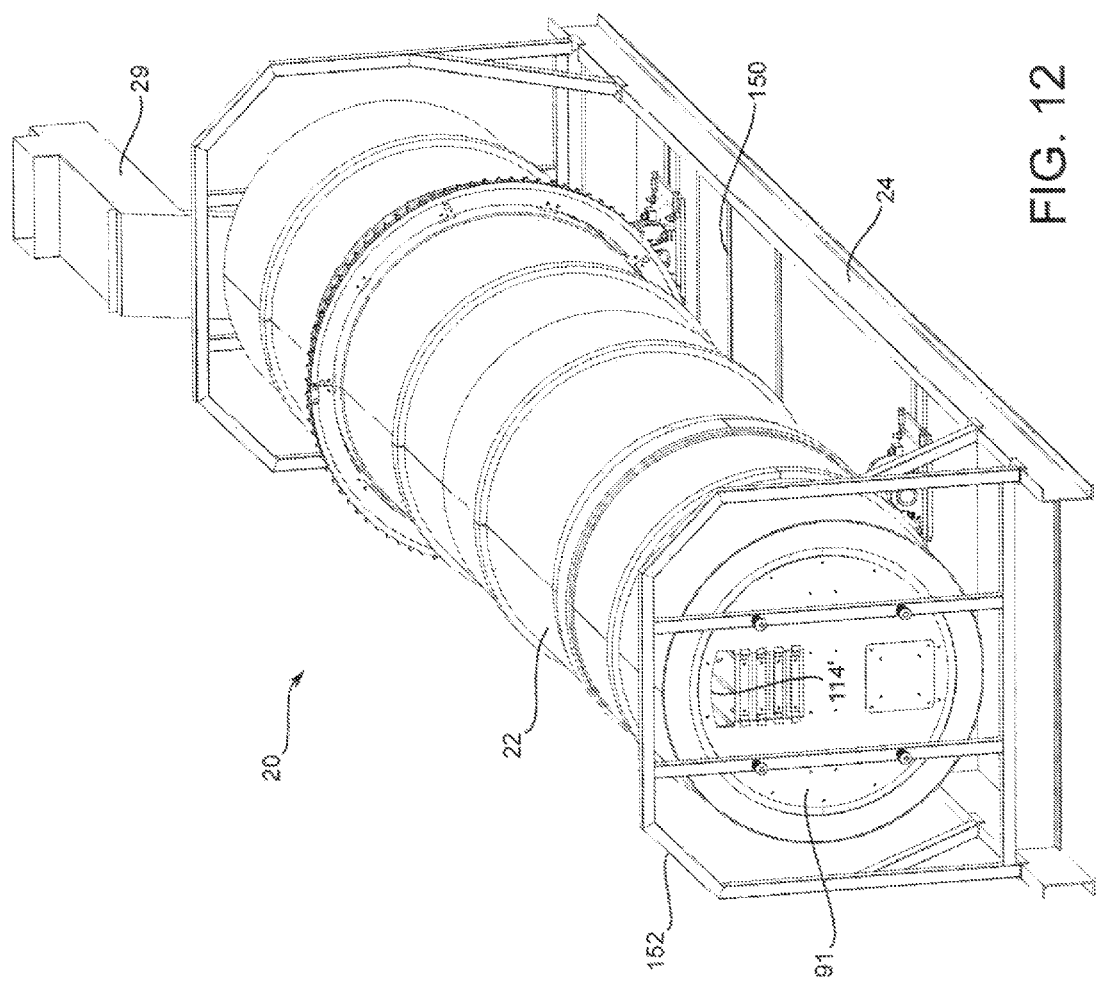
FIG. 12 shows an isometric view of one embodiment of the composter looking at the exit portion.

Of course, it can be appreciated that other methods of carrying out the concept disclosed above for composting material can be utilized. Generally referring to FIGS. 11 and 12, it can be appreciated that the exit cap 91 and entrance cap 87 in one form are substantially fixedly and removably attached to the base frame 24. Substantially attached is defined as accounting for the longitudinal expansion of the entrance and exit caps, which in one form account for the thermal expansion by the expansion attachment system 95 as shown in FIG. 14 and described above. Having a fixed end cap assembly is desirable in one form so the composting action can be of a continuous nature where the entrances and exits are substantially fixed as to allow a constant exit and entrance of material within the fuselage 22. It should be noted that in one form the unit 20 is fairly large at a length of 20-50 feet or more. In the broader scope the length of the composter could be much smaller such as 2 feet in length and greater.

In other forms, the entrance portion 32 and exit portion 34 can be provided with entrance caps 87 and exit caps 91 that are fixedly attached to the fuselage member 22. With such an attachment system, in one form the entrance passage 112 can be as such in a central region, as a circular type of passage for feeding material therein. In other forms, there can be provided an upper rotating member having a port with a circumferential portion slidably attached to the end cap for maintaining an entrance passage above the central longitudinal axis of the fuselage. Further, there need not necessarily be a spring element 122, such as that shown in FIG. 14, for providing an expanding attachment system shown by example at 95. In this form, the entire fuselage could for example expand when heated, and the end caps would simply expand therewith. Further, instead of a continuous process, in the broader scope the composter 20 can be a batch process having material to be composted placed therein was the end cap sealed without an entrance and exit passage, and after a period of time, the material will be expelled out of the central chamber of the fuselage member 22. The composter material could be placed therein by a plurality of methods, such as providing a conveyor-like belt or auger member. Likewise, the material can be removed from the fuselage member by a variety of methods, such as for example having some form of end plate attached to cables or tension members and pulling the end plate therethrough, compressing all of the material to be extruded out of the other end.

With regard to the longitudinally extending slats 52 as shown by way of example in FIG. 8, it should be noted that the observed benefits of the slats include: better heat retention within the fuselage member, better wear resistance of the interior surface of the composter, better gripping of composting material to raise the material higher upon rotation of the fuselage, and microbials being retained between the slat members, or otherwise chambers formed by slat members or other equivalent structures. However, in the broader scope, the material comprising the longitudially extending slats 52 could be positioned immediately adjacent to one another and not forming a substantial space therebetween, whereby the distance parameter as shown and indicated at 60 in FIG. 14 would be effectively reduced to zero by having the slat members adjacent to one another. Further, the slat members could be broadly defined as, for example, defining an interior body of flexible material to be distributed in a helical spiral-like pattern around the interior surface of the fuselage member 22. This embodiment, for example, could have spaces between the spiral elements or they could be adjacent to one another. Of course other forms of providing an interior lining for purposes of heat retention and/or wear resistance can be employed to define an interior body.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. A rotary composter mechanism for composting material, the rotary composter comprising:
   a. a base frame having first and second end portions;
   b. a fuselage member having a longitudinal axis, the fuselage member having an entrance portion and an exit portion, the fuselage further having an interior chamber;
   c. a plurality of interior longitudinal slats positioned in the interior chamber of the fuselage member, the interior slats having a circumferential spacing defining circumferential gaps sufficient so as to house composting material therebetween, the longitudinal slats being larger in their circumferential width than their radial thickness, the circumferential gaps between slats accounting for substantially less than ½ the inner diameter of the fuselage member;
   d. a drive mechanism attached to the base frame and being operatively connected to the fuselage member for rotation of the fuselage member with respect to the base frame;
   e. an entrance cap rotatably coupled to the fuselage member and fixedly and removably attached to the base frame at the first end portion,
   f. an exit cap rotatably mounted to the fuselage member and attached to the base frame at the second end portion,
   g. whereas the entrance or exit cap is operatively connected to the base frame so as to allow a longitudinal change in position between the entrance and the exit cap.

2. The rotary composter mechanism as recited in claim 1 where a circumferential directional width of the longitudinal slats is substantially larger than a radial thickness of the longitudinal slats.

3. The rotary composter mechanism as recited in claim 2 where the radial thickness of the longitudinal slats is greater than ½ inch.

4. The rotary composter mechanism as recited in claim 2 where the radial thickness of the longitudinal slats is greater than 1.5 inch.

5. The rotary composter mechanism as recited in claim 1 where the circumferential gaps between slats total less than ½ the circumferential direction width of the longitudinal slats.

6. The rotary composter mechanism as recited in claim 3 where the entrance cap is provided with a plurality of expansion attachment members.

7. The rotary composter mechanism as recited in claim 1 where the exit cap is provided with a plurality of expansion attachment members.

8. The rotary composter mechanism as recited in claim 7 where the expansion attachment members comprise a spring element that is placed in a higher energy state when the fuselage member expands due to a thermal expansion.

9. The rotary composter mechanism as recited in claim 1 where the longitudinal slat members are operatively configured to reduce the heat transfer to an outer metallic shell of the fuselage member.

10. The rotary composter mechanism as recited in claim 9 where the longitudinal slat members increase the r-value of the heat transfer from the interior chamber portion to an outer surface of the fuselage member by a value of at least R-4.

11. The rotary composter mechanism as recited in claim 1 where the exit cap comprises an adjustable exit passage.

12. The rotary composter mechanism as recited in claim 1 where the entrance cap comprises with an interior wear pad.

13. The rotary composter mechanism as recited in claim 12 where the interior wear pad is provided with first and second sections that are operatively configured to be positioned within the interior chamber region and assembled therein to an operative orientation and attached to an interior region of the end cap.

14. The rotary composter mechanism as recited in claim 1 where the longitudinal axis of the fuselage member is substantially horizontal.

15. The rotary composter mechanism as recited in claim 1 where the longitudinal axis of the fuselage member is greater than 2 degrees from the entrance portion to the exit portion of the fuselage member.

16. The rotary composter mechanism as recited in claim 1 operatively configured to be controlled such that the temperature within the interior chamber of the fuselage member is maintained between 130° and 160° Fahrenheit when the rotary composter is in operation.

17. The rotary composter mechanism as recited in claim 1 where the longitudinal slats are substantially comprised of plastic.

18. The rotary composter mechanism as recited in claim 1 further comprising an entrance passage and an exit passage of the entrance cap and end cap respectively positioned in an upper portion of the entrance and exit cap.

19. The rotary composter mechanism as recited in claim 18 where the upper portion of the entrance cap and the exit cap are located in the upper 50% region of the fuselage member.

20. The rotary composter mechanism as recited in claim 19 where the rotary composter can have 70% of the volume of the interior chamber filled with composting material positioned therein when in operation.

21. The rotary composter mechanism as recited in claim 1 where the drive system is configured to rotate the fuselage member a rate of at least 6 rotations per hour.

22. A method of composting material comprising the steps of:
   a. providing pre-composting material through an entrance passage on a fixed entrance cap;
   b. transferring the pre-composting material into an interior chamber of a fuselage member where the entrance cap forms a portion of the interior chamber;
   c. rotating the interior chamber so as to agitate the pre-composting material;
   d. providing a plurality of longitudinal slats positioned within the chamber region so as to define a plurality of circumferential gaps sized to allow a portion of the pre-composted material be positioned between two adjacent longitudinal slats, the slats being larger in their circumferential width than their radial thickness, such that the circumferential gaps between slats accounting for substantially less than ½ the inner diameter of the fuselage;
   e. providing composting microbes within the interior chamber of the fuselage member so as to allow a portion of the microbes to be positioned between two adjacent longitudinal slats to maintain a portion of the composting microbes in the chamber region as the pre-composting material passes through the fuselage member from the entrance portion to an exit portion;
   f. providing a non-rotating end cap with an exit passage positioned in an upper region of the end cap to allow the composter material which formed from the pre-composting material to exit therefrom.

23. The method as recited in claim 22 where the lower portion of the exit passage is in the upper region of the exit cap.

24. The method as recited in claim 22 where the center of the opening of the exit passage is positioned in the upper region of the exit cap.

25. The method as recited in claim 22 where the exit and entrance caps are fixedly and removably attached to a base frame by way of an expanding attachment system, the expanding attachment system allowing a prescribed amount of longitudinal expansion of the fuselage member.

26. The method as recited in claim 22 further comprising the step of providing an air convection member is in communication with the interior chamber to force air therethrough.

27. A rotary composter mechanism comprising:
   a. a base frame having first and second end portions,
   b. a fuselage member having a longitudinal axis, the fuselage member having an entrance portion and an exit portion and comprised of an outer metallic layer, the fuselage member further having an interior chamber, an interior body comprising an inner surface to increase the wear resistance of the fuselage member, the interior body comprising a plurality of longitudinal slats defining between them circumferential gaps, the slats providing an insulation factor greater than the metallic layer alone, the slats in being larger in their circumferential width than their radial thickness, the circumferential gaps between slats accounting for substantially less than ½ the inner diameter of the fuselage member;
   c. a drive mechanism attached to the base frame and being operatively connected to the fuselage member for rotation of the fuselage member with respect to the base frame;
   d. an entrance cap attached to the fuselage member and an exit cap attached to the fuselage member.

28. The rotary composter as recited in claim 27 where the entrance cap is rotatably attached to the fuselage member providing an entrance port positioned in an upper portion of the entrance cap.

29. The rotary composter as recited in claim 28 where the entrance port is positioned beneath a level of material to be composted in the fuselage member, the fuselage member having an air exit port located at the entrance portion and an air inlet port located at the exit portion of the fuselage.

30. A rotary composter mechanism for composting material, the rotary composter comprising:
   a base frame having first and second end portions;
   a fuselage member having a longitudinal axis, the fuselage member having an entrance portion and an exit portion, the fuselage member further having an interior chamber;
   an interior surface comprising a plurality longitudinal slats defining in a plurality of circumferential gaps, between the plurality of slats, a plurality of retention chambers operatively configured to house composting material therein, the slats being larger in their circumferential width than their radial thickness, the circumferential gaps between slats accounting for substantially less than ½ the inner diameter of the fuselage member;

a drive mechanism attached to the base frame and being operatively connected to the fuselage member for rotation of the fuselage member with respect to the base frame;

an entrance cap attached to the fuselage member;

an exit cap attached to the fuselage member; wherein the retention chamber is provided for housing a portion of the composting material therein while a majority of the composting material passes thereby from the entrance portion to the exit portion and the retained compost material within the retention chamber contains microbials for composting which are provided for the composting material passing thereby, and the entrance portion is provided with a feed mechanism to insert material to be composted in the fuselage member at a height beneath an upper surface of the composting material contained within the fuselage member and an air convection unit provided with communication to the interior chamber of the fuselage member above the upper surface of the material being composted in the fuselage member.

31. The rotary composter as recited in claim 30 where the entrance cap is rotatably attached to the fuselage member providing an entrance port positioned in an upper portion of the entrance cap.

32. The rotary composter as recited in claim 30 where the entrance cap is fixedly attached to the fuselage member.

33. A rotary composter mechanism for composting material, the rotary composter comprising:

a base frame having first and second end portions;

a fuselage member having a longitudinal axis, the fuselage member having an entrance portion and an exit portion, the fuselage member further having an interior chamber;

an interior surface comprising a plurality of retention chambers operatively configured to house composting material therein; the retention chambers being defined by the presence of a plurality of longitudinally extending slats, the slats being larger in their circumferential width than their radial thickness, the slats being configured to retain heat within the fuselage member, circumferential gaps between slats account for substantially less than ½ the inner diameter of the fuselage;

a drive mechanism attached to the base frame and being operatively connected to the fuselage member for rotation of the fuselage member with respect to the base frame;

an entrance cap attached to the fuselage member;

an exit cap attached to the fuselage member; wherein the retention chamber is provided for housing a portion of the composting material therein while a majority of the composting material passes thereby from the entrance portion to the exit portion and the retained compost material within the retention chamber contains microbials for composting which are provided for the composting material passing thereby; and the entrance cap is rotatably attached to the fuselage member providing an entrance port positioned in an upper portion of the entrance cap.

34. The rotary composter as recited in claim 33 where the entrance portion is provided with a feed mechanism to insert material to be composted in the fuselage member at a height beneath an upper surface of the composting material contained within the fuselage member and an air convection unit provided with communication to the interior chamber of the fuselage member above the upper surface of the material being composted in the fuselage member.

35. The rotary composter as recited in claim 33 where the entrance cap is fixedly attached to the fuselage member.

\* \* \* \* \*